US007729680B2

(12) United States Patent
Gozen

(10) Patent No.: US 7,729,680 B2
(45) Date of Patent: Jun. 1, 2010

(54) NOISE SUPPRESSER

(75) Inventor: Shinya Gozen, Hyogo (JP)

(73) Assignee: Panasonic Corporation, Osaka (JP)

( * ) Notice: Subject to any disclaimer, the term of this patent is extended or adjusted under 35 U.S.C. 154(b) by 497 days.

(21) Appl. No.: 11/665,641

(22) PCT Filed: Oct. 26, 2005

(86) PCT No.: PCT/JP2005/019663

§ 371 (c)(1),
(2), (4) Date: Apr. 18, 2007

(87) PCT Pub. No.: WO2006/049052

PCT Pub. Date: May 11, 2006

(65) Prior Publication Data

US 2008/0064357 A1      Mar. 13, 2008

(30) Foreign Application Priority Data

Nov. 2, 2004    (JP)    ............................. 2004-319545

(51) Int. Cl.
*H04B 1/10*    (2006.01)
(52) U.S. Cl. .................... 455/296; 455/226.1
(58) Field of Classification Search .............. 455/226.1, 455/296, 297, 307
See application file for complete search history.

(56) References Cited

U.S. PATENT DOCUMENTS 5,428,832 A    6/1995    Nohara et al.
5,430,894 A    7/1995    Nohara et al.
5,982,901 A *  11/1999   Kane et al. ..................... 381/13
6,304,545 B1   10/2001   Armbruster et al.
2004/0203551 A1* 10/2004 Li et al. ...................... 455/296

FOREIGN PATENT DOCUMENTS

| EP | 0 560 599 | 9/1993 |
| JP | 5-315985 | 11/1993 |
| JP | 2760240 | 3/1998 |
| JP | 0 901 259 | 3/1999 |
| JP | 11-154926 | 6/1999 |
| JP | 2003-316381 | 11/2003 |

* cited by examiner

*Primary Examiner*—Blane J Jackson
(74) *Attorney, Agent, or Firm*—Wenderoth, Lind & Ponack, L.L.P.

(57) ABSTRACT

A noise suppresser is provided which does not generate steady noise generated by a drop in the receiving field strength, pulse-type unsteady noise generated in a multipass environment and the like as well as musical noise due to excessive subtraction and the like.

The noise suppresser (100) includes a field strength analysis unit (3) which analyzes change in a field strength d of a digital signal x, and a frame generation unit (1) which generates a frame made up of signal values accumulated within a range which does not exceed a predetermined threshold value when the analyzed field strength has changed and exceeds the predetermined threshold value. Further, the noise suppresser (100) includes a noise estimation unit (4) which estimates a noise pattern $|N|n'$ mixed in the input signal x when the field strength has changed and exceeds the predetermined threshold value, and a noise suppression unit (5) which suppresses the noise included in the generated frame using the estimated noise pattern.

20 Claims, 18 Drawing Sheets

NOISE SUPPRESSER

TECHNICAL FIELD

The present invention relates to a noise suppresser for suppressing noise elements in a signal in which noise has been mixed, and especially to a noise suppresser for a radio communication receiver and the like.

BACKGROUND ART

The most often cited representative examples of conventional noise suppression methods are the spectrum subtraction method and the Wiener filter method. Other than these methods, various noise suppression methods are being researched and developed such as comb filters and adaptive filters.

FIG. 1 is a diagram which shows the structure of a noise suppresser using a conventional spectral subtraction method. FIG. 2 is a diagram which shows the structure of a noise suppresser that uses a conventional Wiener filter. As shown in FIG. 1 and FIG. 2, in the spectrum subtraction method or the Wiener filter method, a noise spectrum is generally estimated (measured) by a noise region, i.e. a time region in which audio is not included, and as a basic guideline, noise suppression is performed by subtracting the noise elements from the input signal. In any of these noise suppression methods, generally the noise spectrum is estimated according to the following equation and multiplied by the suppression coefficient α, which is a scaling factor for adjusting the noise suppression weight.

$$|Y(f)|=|X(f)|-\alpha|N(f)|$$

Note that X(f) expresses the input signal spectrum, N(f) the noise spectrum and Y(f) the signal spectrum after noise suppression is performed; | | stand for the absolute value of the signal. f expresses the frequency variable.

On the one hand, when the estimation accuracy of the noise spectrum decreases, musical noise particular to the spectrum subtraction method used is generated, due to causes such as excessive subtraction. Although the S/N ratio improves, there is the drawback that, after the noise is suppressed, musical noise such as a wispy digital sound remains.

One source of estimation accuracy deterioration in the noise spectrum is generated when environmental noise is not uniform. Since the noise spectrum is generally not uniform, the suppression coefficient α can be variable according to the environment, and it can be expected that a high noise suppression effect can be obtained. For example, noise suppressers have been proposed which calculate a noise suppression weight based not only on the present input signal spectrum and the average spectrum of the noise, but also on the standard deviation of the noise, and which are handled more suitably to the actual environmental noise (see for example, Patent Document 1). However, even the method in Patent Document 1 cannot process transient noise that does not correlate to the previous noise spectrum. Also, among AM (Amplitude Modulation), FM (Frequency Modulation) and other receivers, receivers are proposed which can obtain an extremely high noise suppression effect with noise estimation, by reading out and performing one-dimensional linear interpolation on the noise patterns that have been calculated and recorded beforehand (see for example, Patent Reference 2). This is because when changes in the noise relative to changes in the field strength are noted as causes of noise generation, the noise can be patterned according to the field strength since the circuits which cause noise generation differ according to the field strength.

Patent Reference 1: Japanese Laid-Open Patent No. 2003-316381 Publication

Patent Reference 2: Japanese Laid-Open Patent No. 2760240 Publication

DISCLOSURE OF INVENTION

Problems that Invention is to Solve

When changes in the field strength in AM and FM receivers are noted as a cause of noise generation, the circuits in which noise is generated often differ according to the field strength. Thus, noise can be patterned according to the field strength. Also, an extremely accurate noise suppression effect can be obtained even for noise estimates performed by reading out a noise pattern that is calculated and stored beforehand, and utilizing one dimensional linear interpolation.

On the other hand, there is often unsteady noise produced by a multi-pass and disturbances, in addition to steady noise which can be patterned according to the field strength, and there is the problem that even the method disclosed in Patent Reference 1 cannot suppress transient noise in particular that does not correlate to the previous noise spectrum.

Since the process of transforming a time series signal into a frequency spectrum is a process performed on a frame basis, the noise suppression process must be a process performed with a particular time width. For example, during an FM stereo broadcast, since the signal band is limited to 15 kHz, sampling is performed at 32 kHz, and when the spectrum transformation is performed at 256 points, the suppression process is performed on an 8 ms basis. In contrast, the receiver field strength transforms from moment to moment, for example, pulse noise generated by dips in the field strength within a multi-pass environment is several μs. In order to suppress noise at several μs in an 8 ms frame, the signal in the 8 ms frame is evenly noise suppressed, and an excessive subtraction occurs in a signal besides the signal to which the pulse noise is added, resulting in the generation of musical noise.

The present invention solves the problems above and takes as an object providing a noise suppresser which can effectively suppress stable noise generated by drops in the field strength, and which can simultaneously suppress transient environmental noise effectively.

Means to Solve the Problems

In order to solve the problems above, the noise suppresser in the present invention includes an accumulation unit which accumulates signal strength values of a digital input signal; a frame generation unit which generates a frame in accordance with the signal strength of the inputted input signal, the frame being a collection of signal values including the signal strength values that have been accumulated; a noise estimation unit which estimates a noise pattern mixed in the input signal within the generated frame, according to the signal strength of the generated frame; and a noise suppression unit which suppresses the noise included in the generated frame using the estimated noise pattern.

Note that the present invention can not only be embodied as the above kind of noise suppresser but may also be structured as an FM and AM receiving device including the noise suppresser, or, as a noise suppression method having, as steps, the characteristic constituent elements included in the noise suppresser, and as a program that causes a computer to execute the steps. It goes without saying that the program can be distributed on a recording medium such as a CD-ROM, and via a transmission medium such as a communication network.

Effects of the Invention

By generating a frame that matches changes in the receiving field strength, even an unsteady noise can be considered a steady noise within a reduced frame, and thus errors in estimating steady noise can be reduced. At the same time, it can be estimated whether the noise is steady or unsteady by monitoring changes in the receiving field strength, and when the noise is unsteady, the noise suppression effect can be improved by a stronger suppression process within the reduced frame.

According to the noise suppresser in the present invention, steady noise generated by drops in the field strength can be effectively suppressed, and at the same time, transient environmental noise can be effectively suppressed.

NUMERICAL REFERENCES

Figure 1:
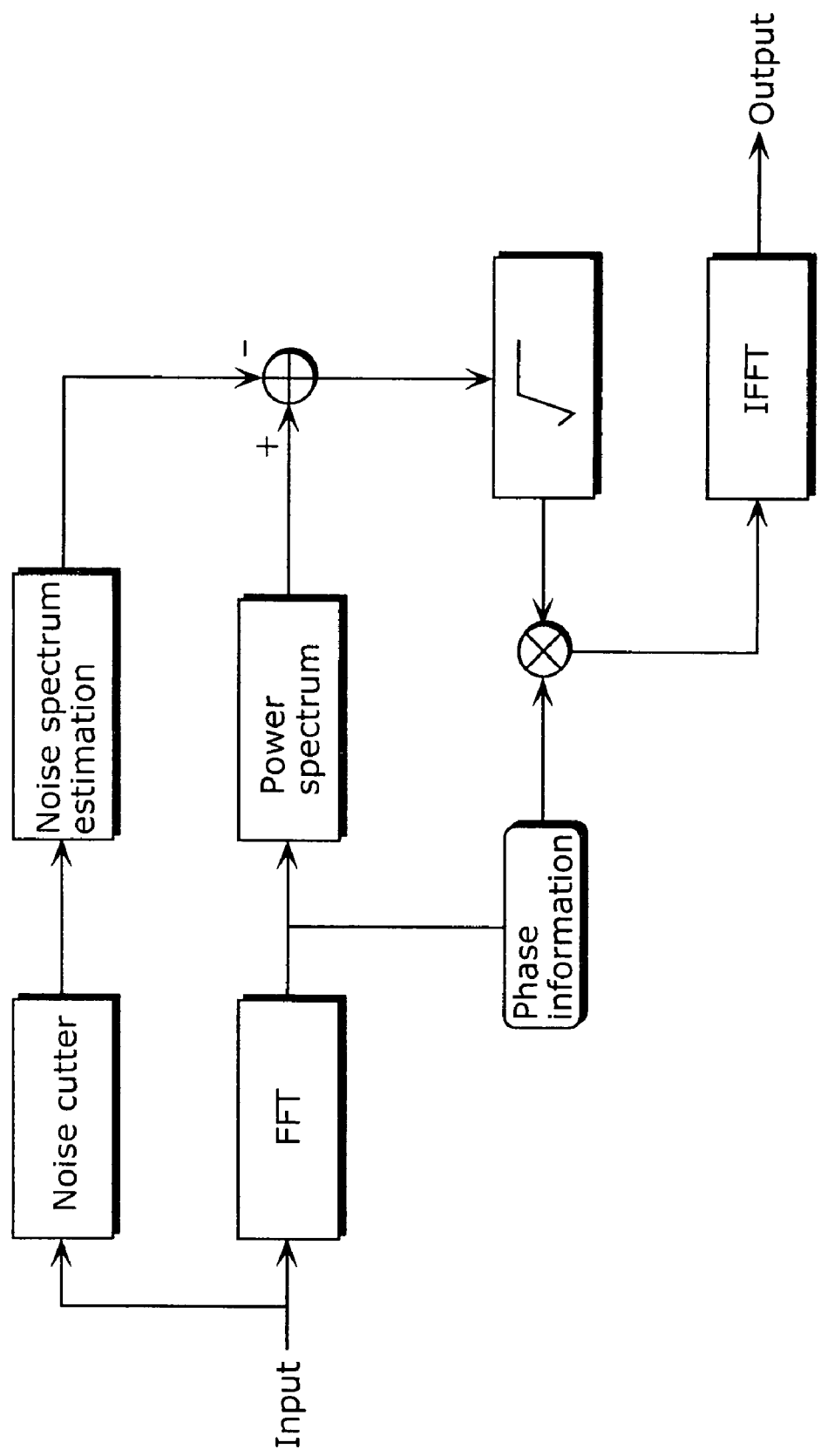
FIG. 1 is a diagram which shows the structure of a noise suppresser using a conventional spectral subtraction method.
Figure 2:
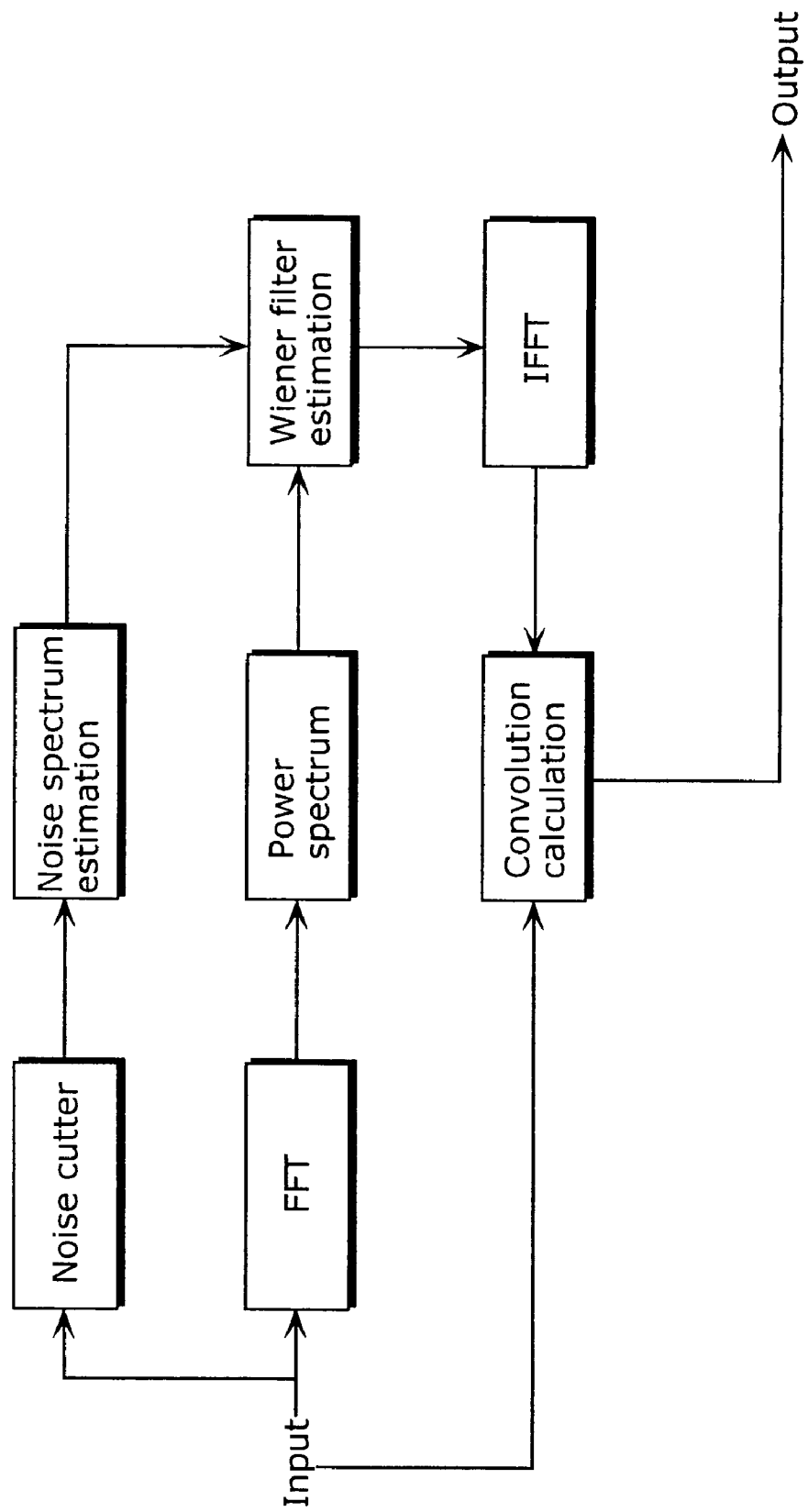
FIG. 2 is a diagram which shows the structure of a noise suppresser that uses a conventional Wiener filter.

100 Noise suppresser
101 Antenna
102 Tuner
103 A/D converter
104 Speaker
1 Frame generation unit
2 Spectrum transformation unit
3 Field strength analysis unit
4 Noise estimation unit
5 Noise suppression unit
6 Signal strength analysis unit
31 Field strength averaging unit
32 Field strength change detection unit
33 Frame length determination unit
41 Field strength averaging unit
42 Noise pattern storage unit
43 Noise calculation unit
51 Suppression weight estimation unit
52 Spectrum subtraction unit
53 Spectrum inverse transformation unit
54 Convolution calculation unit

BEST MODE FOR CARRYING OUT THE INVENTION

Below, the embodiments of the present invention are explained with reference to the drawings.

First Embodiment

Figure 3:
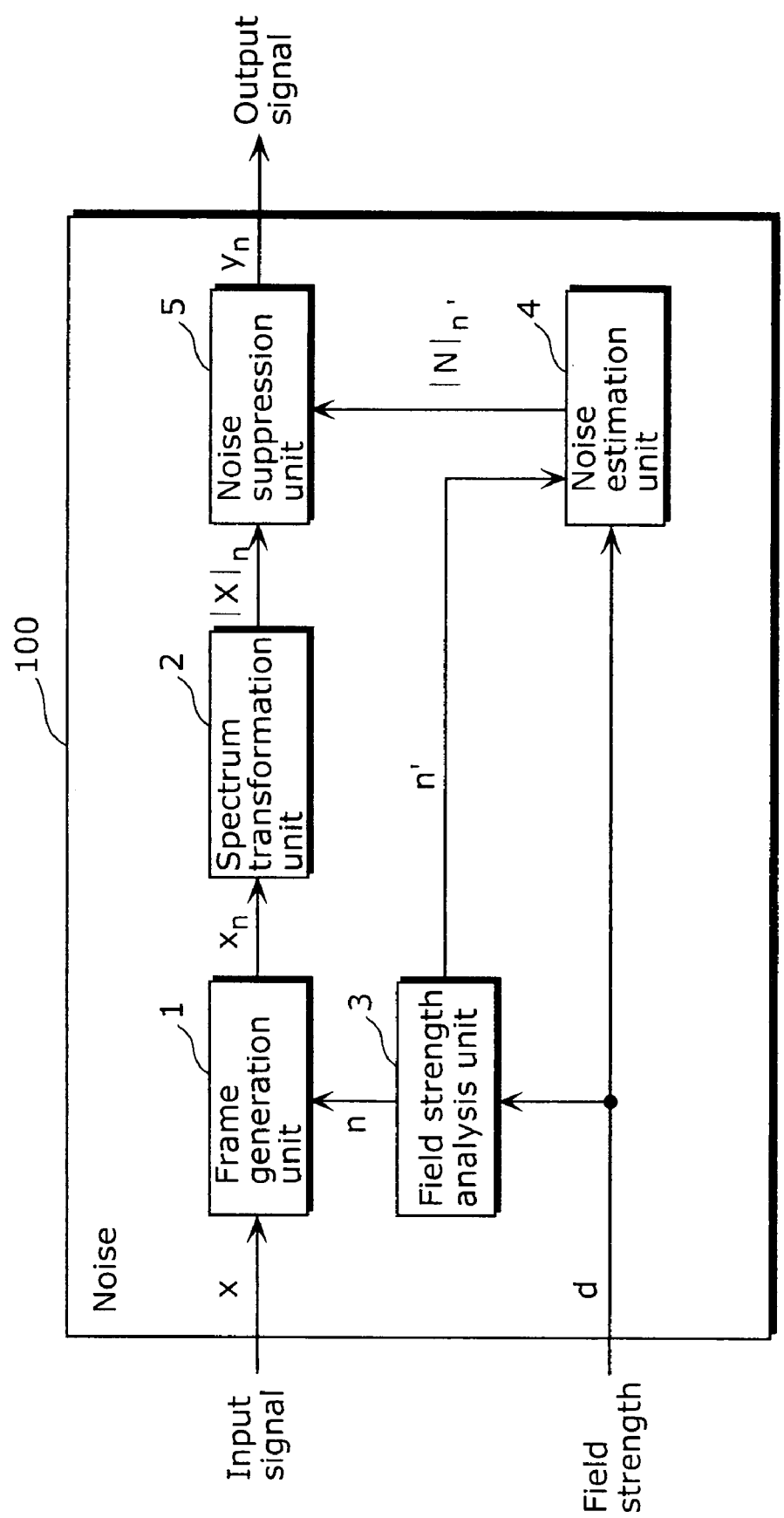
FIG. 3 is a block diagram which shows a structure of the noise suppresser in the present embodiment.

FIG. 3 is a block diagram which shows the structure of the noise suppresser in the present embodiment. In the noise suppresser 100 in the first embodiment, change in the noise pattern according to the degree of change in the field strength is noted. The noise suppresser makes a single frame with a sample group where the change in the field strength is within a fixed range. After the noise suppresser transforms a sample in each frame into a spectrum, the difference in the noise spectrum corresponding to each frame is outputted. Normally, a pre-determined constant number of consecutive samples becomes a frame, and a process such as frequency conversion and quantization is performed, however here the frame has a variable length.

Figure 4:
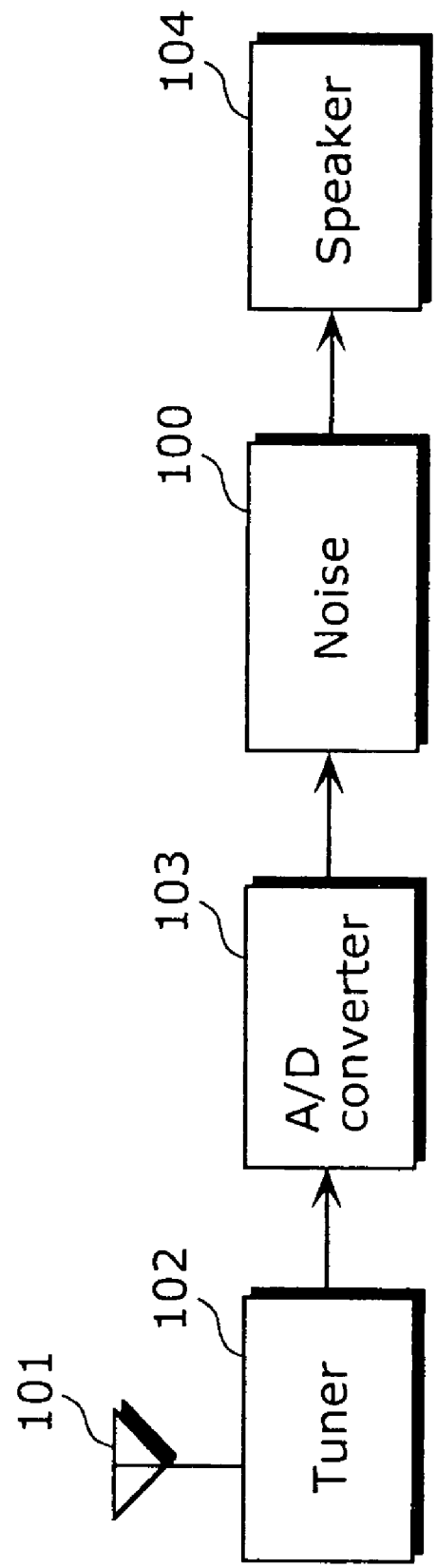
FIG. 4 is a block diagram which shows an example of the structure of a radio which includes a noise suppresser as shown in FIG. 3.

FIG. 4 is a block diagram which shows an example of the structure of a radio which includes the noise suppresser 100 as shown in FIG. 3. The radio includes an antenna 101, a tuner 102, an A/D converter 103, a noise suppresser 100 and a speaker 104. The antenna 101 receives an analog FM signal or AM signal transmitted from a broadcast station. From a carrier wave at a specific frequency, the tuner 102 isolates and extracts an audio signal and the like. The A/D converter 103 transforms the isolated and extracted analog signal into a digital signal. The noise suppresser 100 suppresses noise in the digital signal. The speaker 104 converts the digital signal in which noise has been suppressed into an analog audio signal and outputs the audio.

The noise suppresser shown in FIG. 3 more specifically includes a frame generation unit 1, a spectrum transformation unit 2, a field strength analysis unit 3, a noise estimation unit 4 and a noise suppression unit 5. The frame generation unit 1 corresponds to "a frame generation unit operable to generate a frame which is a collection of signal values including the signal strength values that have been accumulated according to the signal strength of the inputted input signal", and generates a frame with a time length necessary for the subsequent spectrum transformation unit 2 to process the time series signal inputted as digital values by the external A/D converter. The spectrum transformation unit 2 transforms the inputted time series signal of one frame into a frequency spectrum according to the frame length of the signal. Or, the inputted time series signal is transformed up until to the power spectrum according to a process in the subsequent unit. The Fast Fourier Transform (FFT) is widely known for transforming a time series signal into a frequency spectrum, however the present invention is not limited to this technique. Indeed, the length of the frame generated by the frame generation unit 1 is determined by the field strength analysis unit 3.

The field strength analysis unit 3 partially corresponds to "an accumulation unit operable to accumulate signal strength values of a digital input signal; and a frame generation unit operable to generate a frame which is a collection of signal values including the signal strength values that have been accumulated according to the signal strength of the inputted input signal", and determines the frame length (number of samples n) when the spectrum transformation of the input signal X is performed according to changes in the field strength d. More specifically, the field strength analysis unit 3 makes the time series signal inputted during this time while the field strength changes within the predetermined range belong to the same frame, and on the contrary, when the field strength changes to above a certain strength, the field strength analysis unit 3 makes the signal inputted afterward belong to a different frame. Also, the field strength analysis unit 3 simultaneously determines the spectral length n' of the noise spectrum estimated by the noise estimation unit 4. The noise estimation unit 4 corresponds to "a noise estimation unit operable to estimate the noise pattern mixed in the input signal within the frame according to the signal strength of the generated frame", estimates and outputs the noise spectrum relative to the inputted field strength. The outputted noise spectrum is either a frequency spectrum or a power spectrum, according to the process in the subsequent unit. The number of noise spectrum points outputted by the noise estimation unit 4 is determined by the field strength analysis unit 3 in the same way as the frame generated with the input signal. In this case, the spectrum length of the noise spectrum is a spectrum length made up of a number of points equal to the frame length of the input signal. The noise suppression unit 5 corresponds to "a noise suppression unit operable to suppress the noise included in the generated frame using the estimated noise pattern". Using the input signal spectrum and the estimated noise spectrum, the noise suppression unit 5 determines the suppression weight and for example, subtracts the suppression weight so determined from the input signal, suppresses the noise elements included in the input signal, and outputs the suppressed signal.

Figure 5:
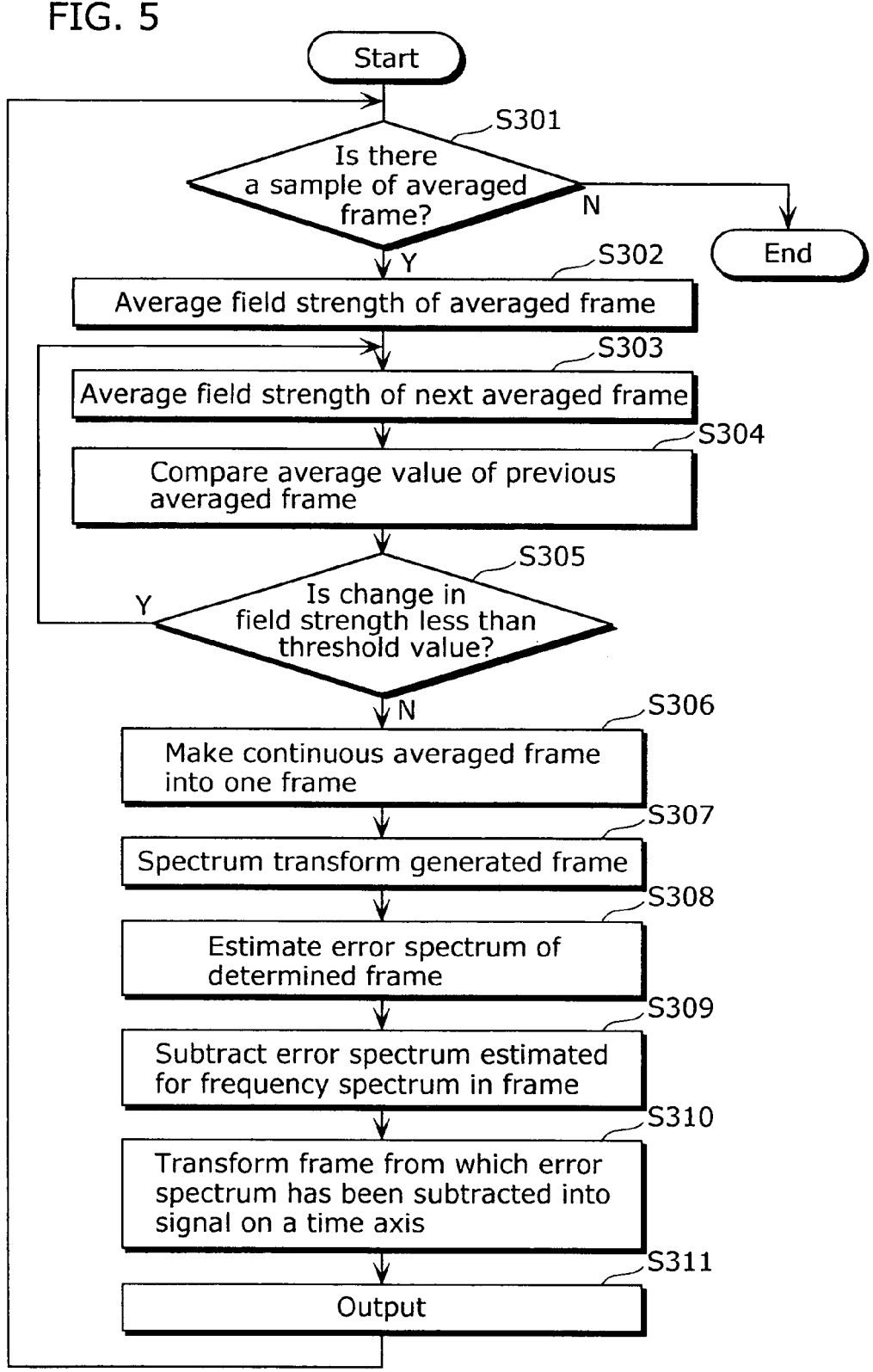
FIG. 5 is a flowchart which shows an example of the frame generation sequence performed by a field strength analysis unit, which is shown in FIG. 3.
Figure 6:
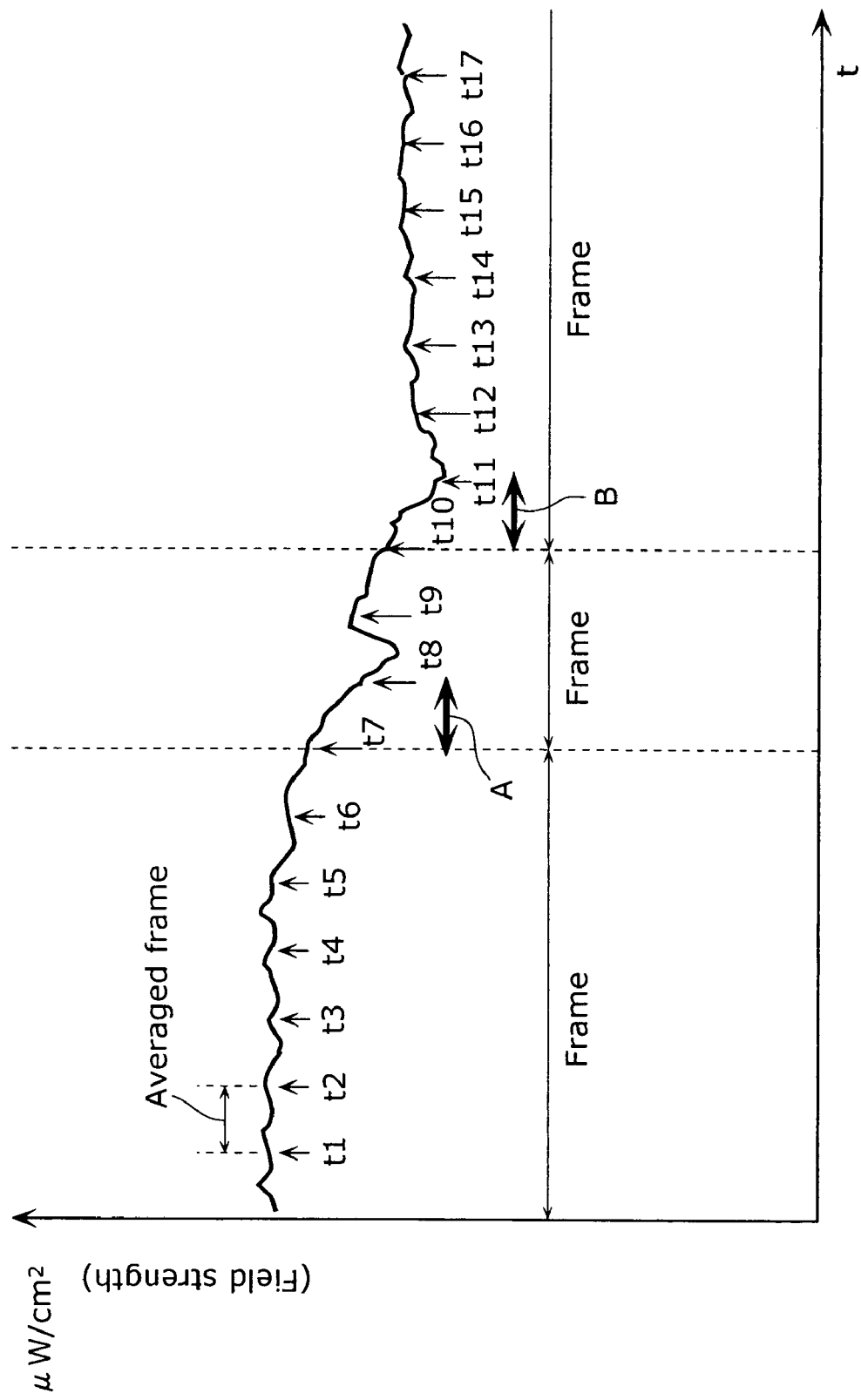
FIG. 6 is a diagram which shows the relationship between the change in the field strength and a division of the frames.
Figure 7:
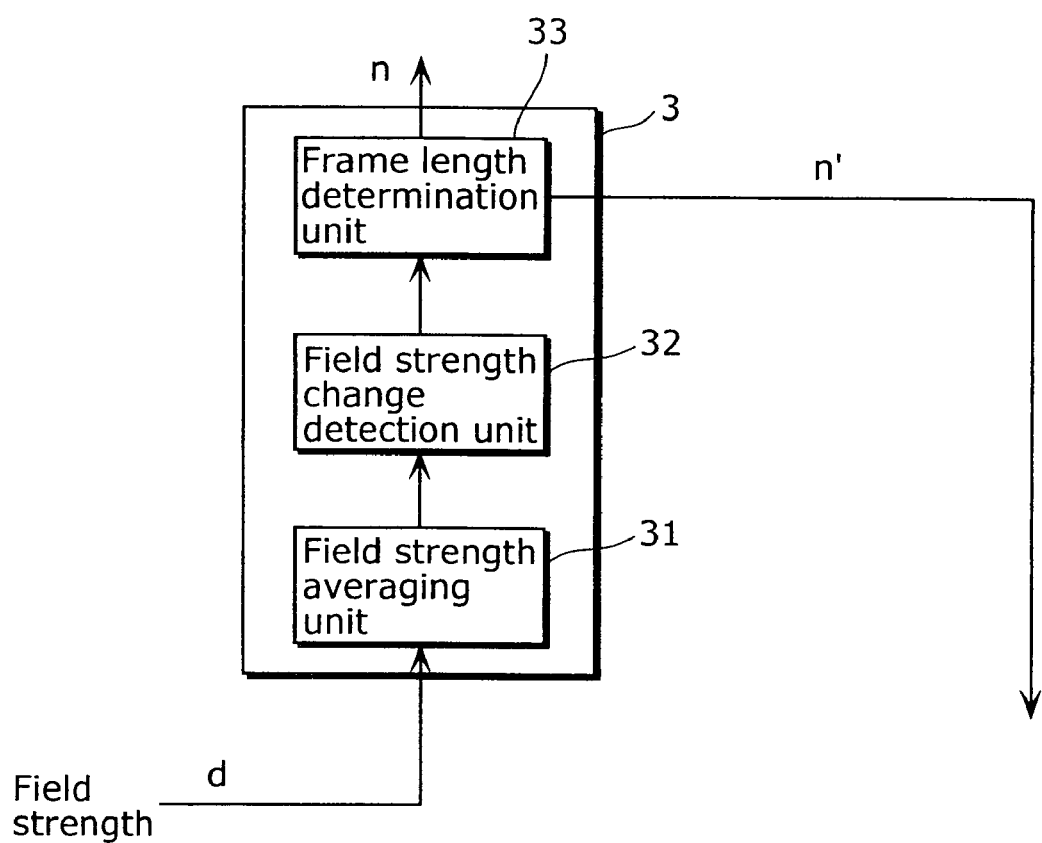
FIG. 7 is a diagram which shows an example of a more detailed structure of the field strength analysis unit shown in FIG. 3.

The detailed operations of the noise suppresser 100 constructed as above are explained below. FIG. 5 is a flowchart which shows an example of the frame generation sequence performed by the field strength analysis unit shown in FIG. 3. FIG. 6 is a diagram which shows the relationship between the change in the field strength and the frame division. FIG. 7 is a diagram which shows a more detailed example of the structure of the field strength analysis unit 3 shown in FIG. 3. The field strength analysis unit 3 is a processing unit which detects the field strength of consecutively inputted points, and determines the length of each frame. The field strength analysis unit 3 includes inside of it a field strength averaging unit 31, a field strength change estimation unit 32 and a frame length determination unit 33. The field strength averaging unit 31 corresponds to "a signal strength calculation unit operable to calculate an average value of the signal strength in each subframe, the subframe being a basis having a predetermined length from which a frame is generated". The field strength change detection unit 32 corresponds to "a signal strength change detection unit operable to detect a change in the signal strength of the input signal from the inputted input signal strength". The field strength change detection unit 32 also corresponds to "an average value comparison unit operable to compare the average value of the signal strength in the subframe with an average value of the signal strength of an immediately preceding subframe".

When the signal values of the points which make up the smallest of the frames (for example, t1 through t2 in FIG. 6) are inputted into the field strength analysis unit (S301), values of field strength d with the same number of points as the sample are accumulated. The field strength averaging unit 31 averages the accumulated field strength values (S302). Here, the predetermined number of points stands for those points included in the minimum frame time (below called an "averaged frame") that is frame generated by the frame generation unit 1. For example, the number of points should be a power of 2 and on average about 64 points is preferable. Next, the values of field strength d of the new averaged frame (for example, t2 through t3) are averaged (S303) and the previous averaged field strength values (of the immediately preceding averaged frames [t1 through t2]) are compared with the arranged values of the field strength d of the new averaged frame the field strength change detection unit 32 (S304). As a result of the comparison, when the change in the averaged field strength is less than or equal to (or less than) a threshold value, the field strength change detection unit 32 continues the comparison with the average field strength of the next averaged frame (for example, t3 through t4) (S303, S304). On the contrary, for example, when the average value of the field strength for the averaged frames t6 through t7 and the average value of the field strength for the average frames t7 through t8 (pictured with a bold arrow A) are compared, the field strength change detection unit 32 generates a frame using consecutive averaged frames up to the averaged frame (t7) (S306) when the change in the averaged field strength exceeds (or is greater than or equal to) a threshold.

Note that the field strength analysis unit 32, does not need to compare consecutive averaged frames, and for example may compare the frame with a lead averaged frame (of the immediately preceding frame). Otherwise, with a present averaged frame for example, the field strength analysis unit 32 may compare the lead averaged frame among several of the previous frames within a range that does not exceed 1024 points with the frame. In this way, by comparing the field strength of the present averaged frame with the lead average frame among temporally previous frames to which the current averaged frame does not belong, there is the effect that changes in the field strength can be detected even when the field strength changes smoothly and no large differences arise between adjacent average frames. Also, in the comparison with the threshold value, the field strength analysis unit 32 may use the difference between average field strength values for two of the average frames or a ratio of the same. Also, when the present averaged frame and an averaged frame of some previous frames are compared, the lead averaged frame does not necessarily need to be compared and an averaged frame in the middle of several frames or the final averaged frame may be used in the comparison.

Figure 8:
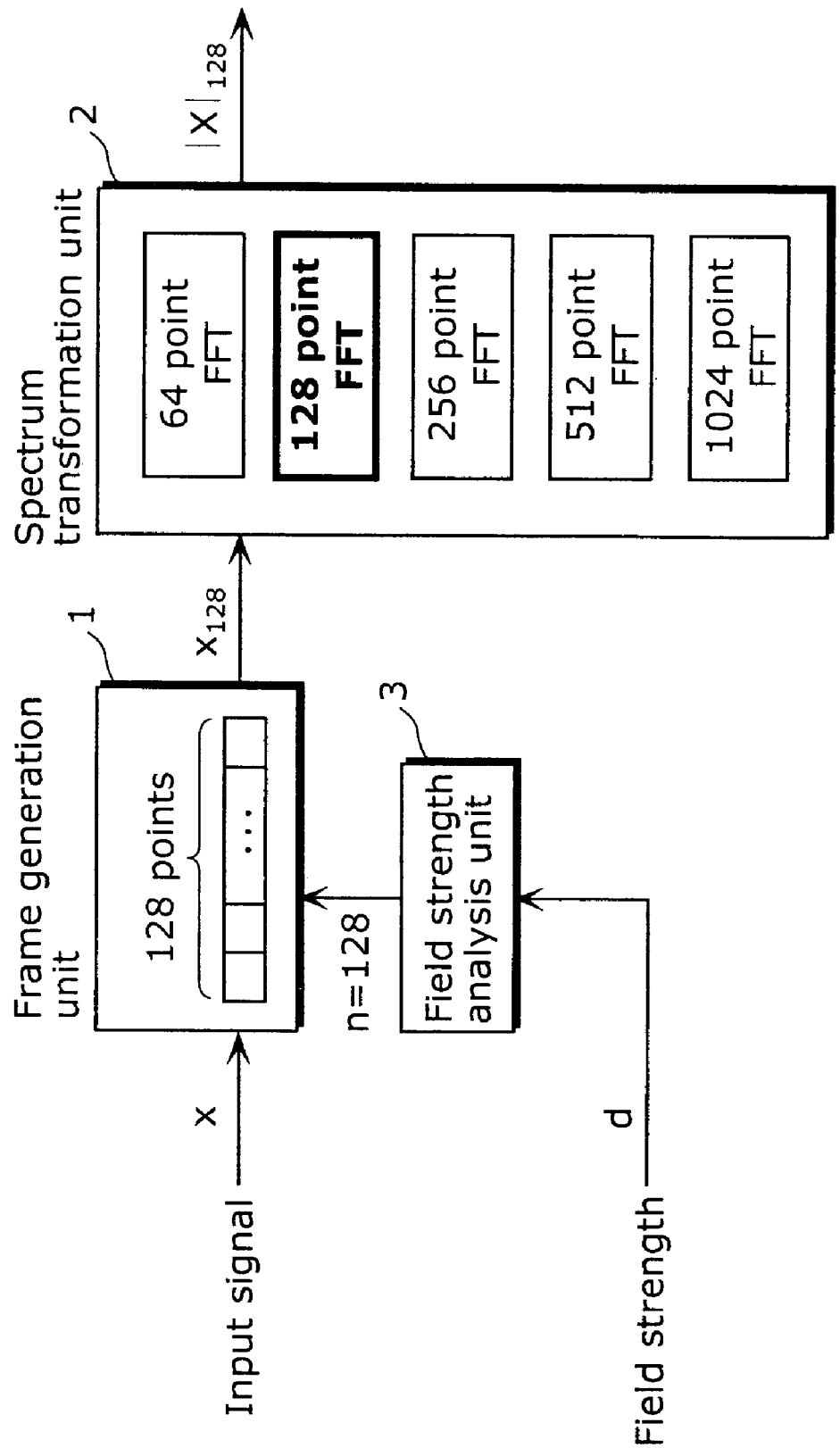
FIG. 8 is a diagram which shows an example of a structure for when a frame is generated with the frame length designated by the field strength analysis unit, and a spectrum transformation is performed with the same frame length as the frame that is generated.

FIG. 8 is a diagram which shows an example of the structure when a frame is generated with the frame length designated by the field strength analysis unit 3, and a spectrum transformation is performed with the same frame length as the generated frame. As shown in FIG. 8, the field strength analysis unit 3 detects changes in the inputted field strength, and for example, determines that the frame length is n=128 points. The field strength analysis unit 3 inputs the frame length determined as n=128 into the frame generation unit 1, and outputs a 128 point input signal X128 to the spectrum transformation unit 2. The spectrum transformation unit 2 transforms the inputted input signal X128 into a 128 bit Fast Fourier Transform FTT, of which the absolute value |X| 128 is outputted by the spectrum transformation unit 2 to the noise suppression unit 5.

Figure 9:
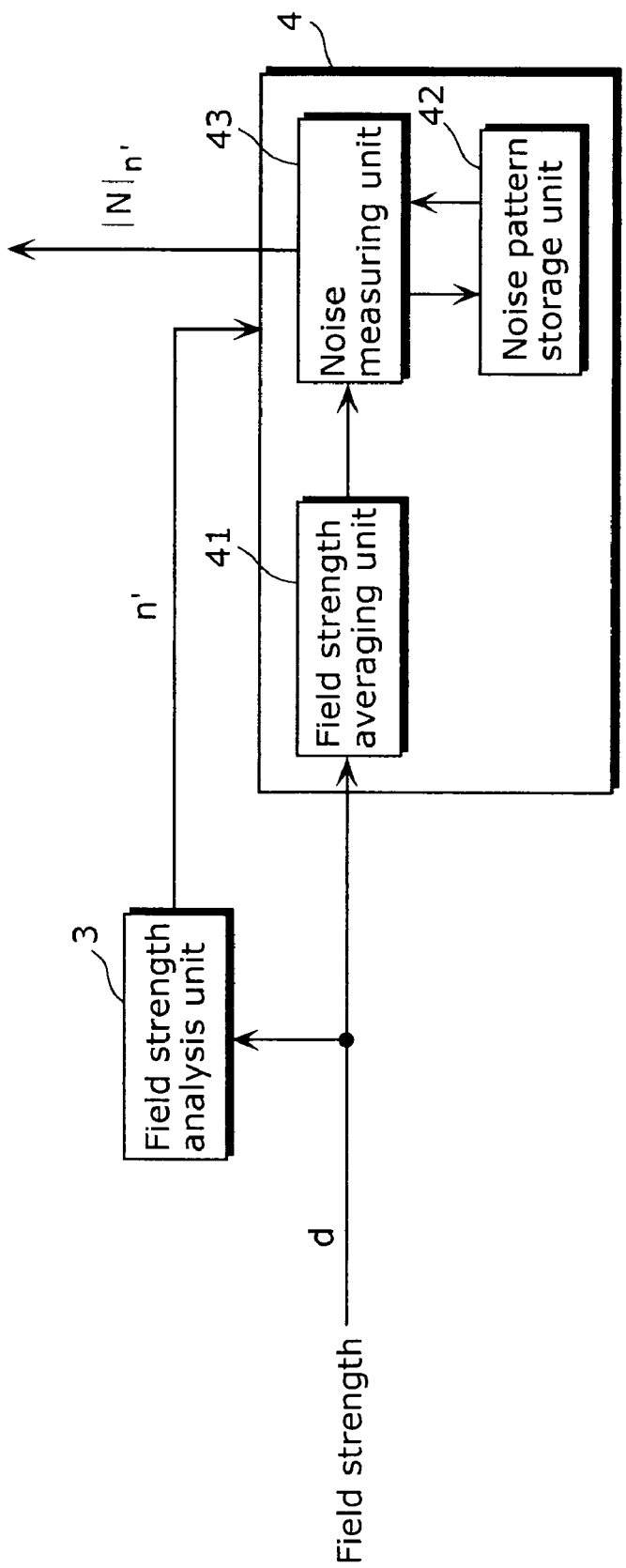
FIG. 9 is a diagram which shows a detailed example of the structure of the noise estimation unit shown in FIG. 3.

FIG. 9 is a diagram which shows a detailed example of the structure of the noise estimation unit 4 shown in FIG. 3. The noise estimation unit 4 is a processing unit which outputs a noise pattern for the field strength based on the field strength d of each point inputted from outside and the frame length n' inputted from the field strength analysis unit 3. The noise estimation unit 4 includes inside a noise pattern storage unit 42 which stores noise patterns for each of the various field strength values. Note that in the present embodiment, the noise pattern is stored beforehand in the noise pattern storage unit 42, however the source of the noise emission in the input signal may be analyzed in the noise pattern and a noise pattern for a specific field strength may be drawn up. Note that according to Patent Reference 2, one of the reasons that noise occurs in AM, FM and other receivers is that noise arises from the circuits used by the receiver. Since the circuit which causes the noise varies according to field strength, noise from the circuit can be patterned according to the field strength. Therefore, in the present embodiment, the noise estimation unit 4 calculates a noise pattern for each of the field strength values beforehand and stores the noise pattern in the noise pattern storage unit 42. When suppressing the noise, the noise estimation unit 4 reads out the necessary noise pattern from the noise pattern storage unit 42 and the noise pattern realizes a structure for suppressing the noise.

Figure 10:
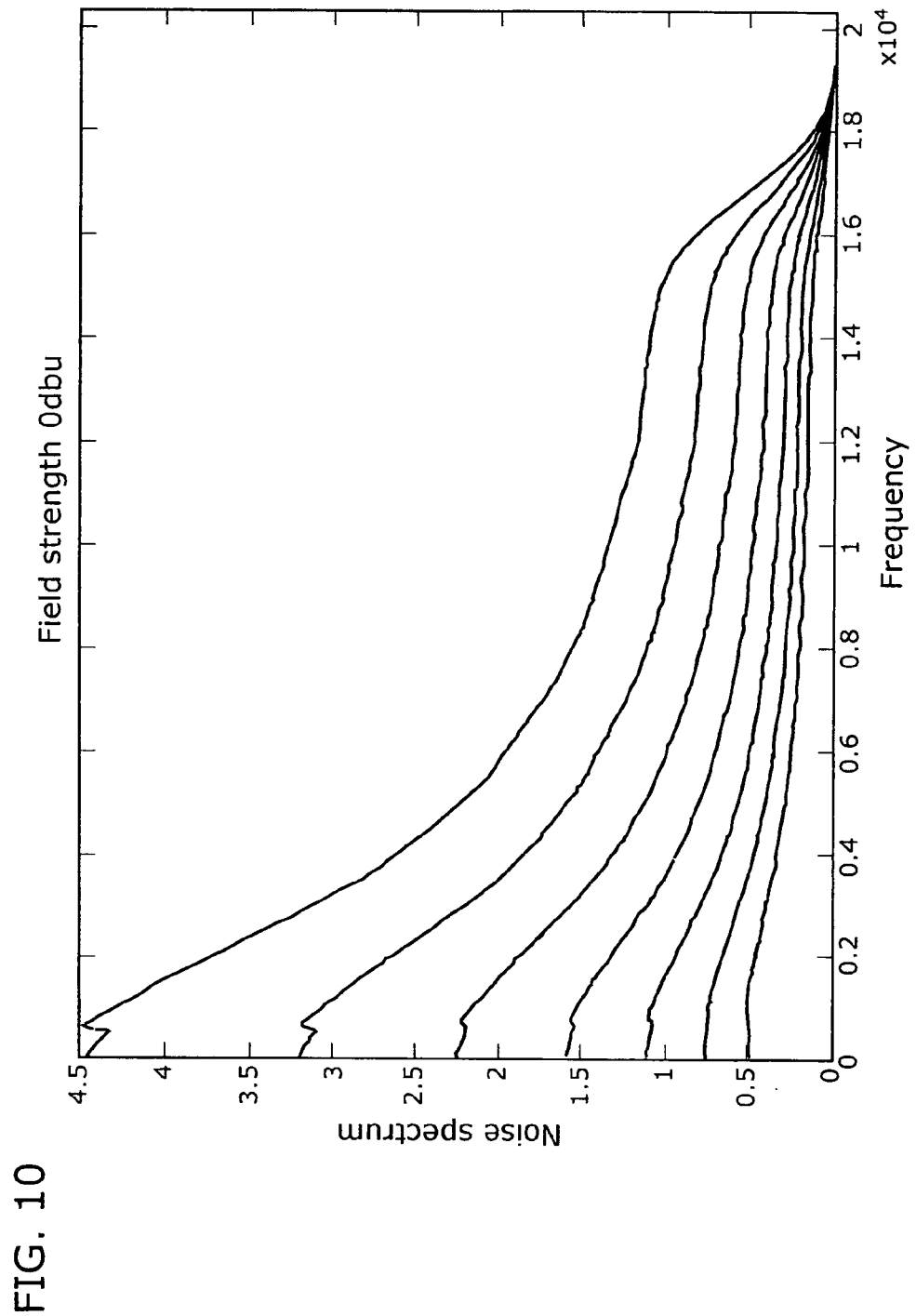
FIG. 10 is a graph which displays the noise spectrum when the FFT frame length with the receiving field strength 0 dBμ in the FM receiver is changed.

The field strength averaging unit 41 corresponds to "a signal strength average value calculation unit operable to average the signal strength by the frame length generated by said frame generation unit" and calculates an average value of the field strength within a length of time for suppressing the noise (frame length). Note that the average value of the field strength is also calculated inside the field strength analysis unit 3, and so the field strength averaging unit 41 can be excluded. Also, FIG. 10 is a graph which displays the noise spectrum in the FM receiver when the value of the receiving field strength is 0 dbμ, and the frame length is changed to the FFT frame length. As shown in FIG. 10, when the frame length is changed and a spectrum transformation is performed on a noise with the same field strength, the noise pattern stored in the noise pattern storage unit 42 has a correlation with each noise spectrum. Therefore, the noise pattern storage unit 42 stores only the noise pattern with the longest frame length instead of storing noise patterns for each frame length during frame generation. Thus, the noise calculation unit 43 creates a noise pattern for another frame length by performing one-dimensional interpolation, interpolation or gain adjustment, and thinning the number of points. The noise calculation unit 43 corresponds to "a noise calculation unit operable to calculate a noise pattern of the generated frame length according to the signal strength averaged by said signal strength average value calculation unit (i.e. the field strength averaging unit 41)". Thus, the storage capacity of the noise pattern storage unit 42 can be reduced.

In FIG. 10, the number of points decrease from the highest spectrum level of 2048 points when the FFT is applied, from 1024 points, to 512 points and so on, and the spectral level is at its lowest at 32 points when the FFT is applied. In this way, only the 2048 point FFT noise pattern is stored in the noise pattern storage unit 42, and there is the effect that the memory capacity of the noise pattern storage unit 42 can be economized by generating a noise pattern with a frame length according to the calculation performed by the noise calculation unit 43, once the frame length has become a number besides 2048 points.

Figure 11:
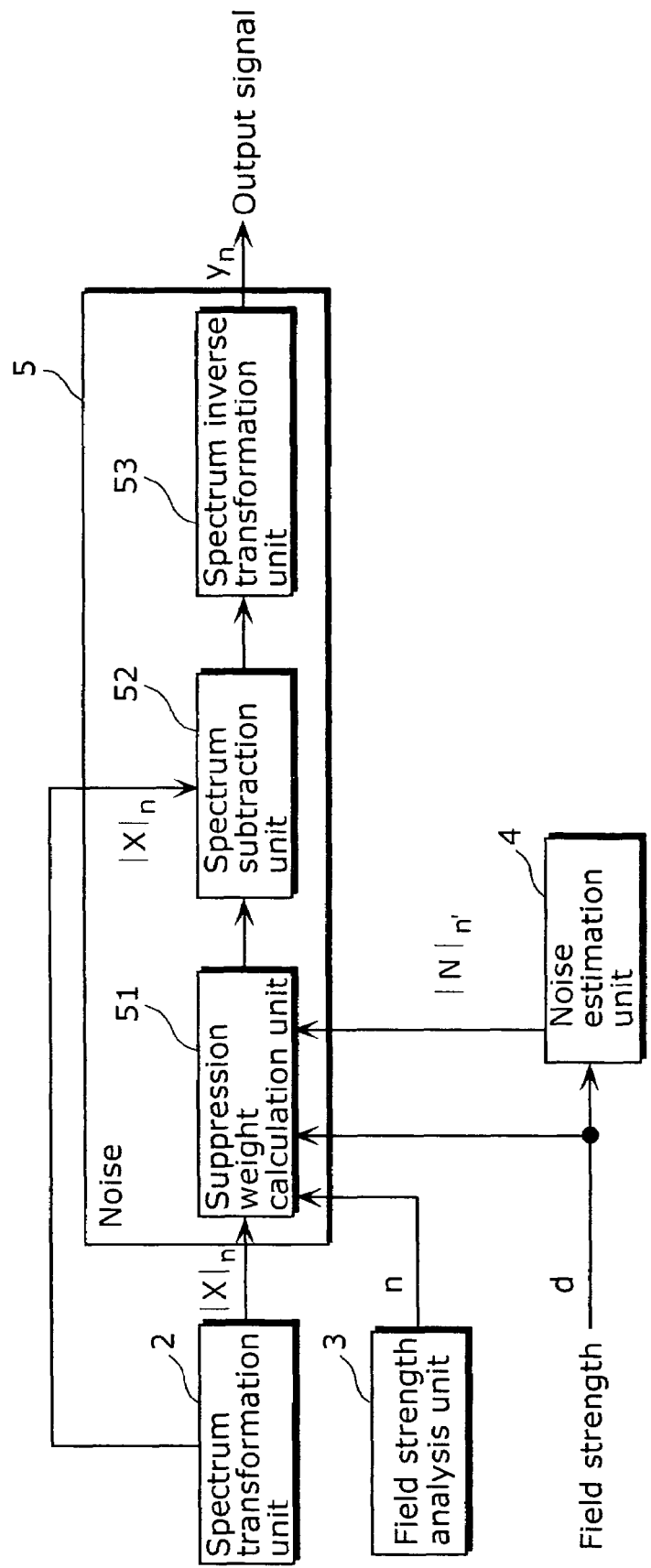
FIG. 11 is a block diagram which shows a detailed example of the structure when noise in the input signal is suppressed by subtracting the noise spectrum, displayed in a frequency spectrum state, from the input spectrum.
Figure 12:
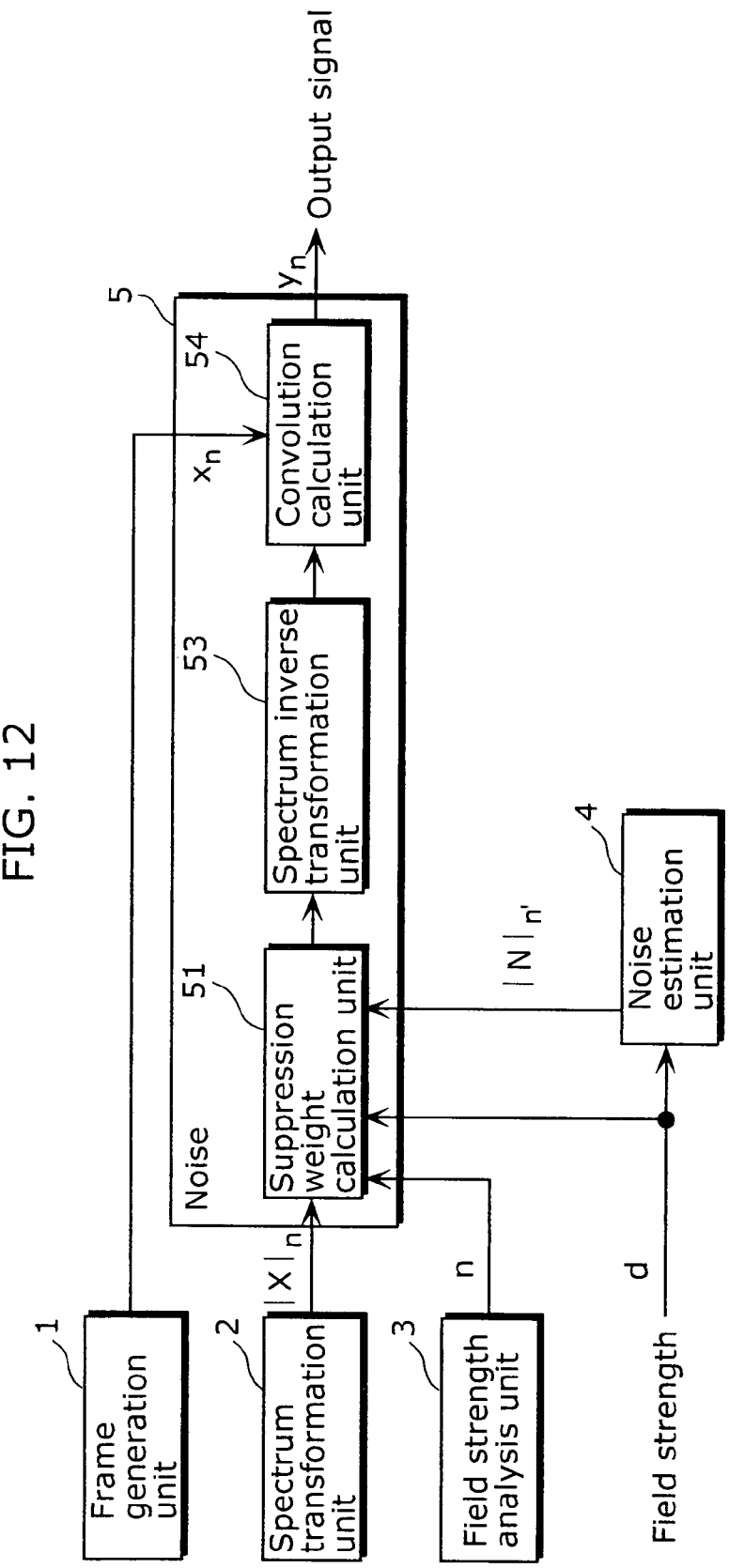
FIG. 12 is a block diagram which shows a detailed example of the structure when noise is suppressed after the noise spectrum and the input signal are inverse transformed in a time region.

FIG. 11 is a block diagram which shows a detailed example of a structure when noise in the input signal is suppressed by subtracting the noise spectrum in a frequency spectrum state from the input spectrum. As shown in FIG. 3 and FIG. 11, when the frame length is determined (S306), the determined frame is spectrum transformed by the spectrum transformation unit 2 (S307) and the noise spectrum for the transformed frame is estimated by the noise estimation unit 4 (S308). The input signal spectrum outputted by the spectrum transformation unit 2 and the estimated noise spectrum outputted as above by the noise estimation unit 4 are inputted into the noise suppression unit 5 where a suppression weight is determined and noise elements included in the input signal are suppressed. In the suppression process, the spectrum subtraction unit 52 subtracts the noise spectrum from the input signal spectrum in the frequency region (S309). In this way, an output signal of good sound quality with reduced noise can be obtained (S311) by the spectrum subtraction unit 52 removing the noise spectrum from the frequency spectrum and by the spectrum inverse transformation unit 53 inverse transforming the noise spectrum into a time region signal (S310). Note that in the present embodiment, the noise may be suppressed in this way by subtracting the noise spectrum in the frequency spectrum state, and the calculation may be performed after inverse transforming the signal into a signal on the time axis. FIG. 12 is a block diagram which shows a detailed example of the noise suppression structure after the noise spectrum and the input signal are inverse transformed into a time region signal. As shown in FIG. 12, a convolution calculation unit 54 is placed subsequent to the spectrum inverse transformation unit 53, and by the convolution calculation unit performing a convolution calculation on the input signal in the time region, noise from the input signal may be suppressed.

Also, in the same way as the Patent Document 2, $$|Y(f)| = |X(f)| - \alpha|N(f)|$$
$$= |X(f)| \cdot (1 - \alpha|N(f)|/|X(f)|)$$

and when $$1 - \alpha|N(f)|/|X(f)| (\text{note that} > \beta)$$

is calculated as a suppression weight by the suppression weight calculation unit 51, a more efficient noise suppression effect can be obtained by adding and controlling the suppression coefficient α and the threshold coefficient β, not only to the field strength but also to the frame length calculated by the field strength analysis unit 3. For example, it can be judged that, even when the field strength is the same and the frame length is short, there is not an even deterioration in the receiving field strength but instead a dip in the field strength in a multi-pass environment and so on, and thus the threshold coefficient can be decreased while increasing the suppression weight since the possibility increases that intra-frame noise is not a steady white-type but instead an unsteady pulse-type noise. At this point, a steady noise can be supposed by reducing the frame length to within a frame even a frame in an unsteady pulse noise, and thus the estimated noise spectrum |N(f)| can obtain an efficient noise suppression effect, without the estimation error given by the steady noise pattern increasing.

Note that the noise suppresser 100 in the present invention is useful as an FM or AM radio receiver and television receiver in a vehicle. The present invention is not limited to this, and in the case where the receiver is built into a vehicle, the following special effects may be obtained. In other words, when the receiver is loaded in a vehicle, it is very likely that the field strength will frequently fluctuate when the vehicle enters for example a gap between buildings, a valley between mountains and so on. However, when a field strength can be obtained that is greater than or equal to a fixed level, there is ultimately more damage in over-emulating the field strength changes, since the effect of the noise is not so large. Accordingly, it is preferable to set the threshold value, which determines the frame length for a vehicle when being driven, to a value greater than when the vehicle is stopped, so that the changes in the field strength are not over-emulated. On the contrary, the frame length is set so that, for example, a vehicle being driven has at least 256 points in a single frame, and 1024 points in a single frame when the vehicle is stopped. Thus, even when changes in field strength between adjacent averaged frames are severe and exceed the threshold value even though the threshold value is set to a large value, it is possible to prevent another frame from being divided into at least 256 points. Even when the field strength does not change when the vehicle is stopped and the change in the field strength between averaged and adjacent frames does not exceed the threshold value, a single frame can be divided at maximum into a 1024 point sample. Note that the frame length when the vehicle is being driven and the frame length when the vehicle is stopped are not limited to the above example (being driven, 256 points, stopped, 1024 points), and may be prescribed to a varying point index (for example, being driven, 128 points, stopped, 2048 points and so on).

Also, except for the case where the receiver is loaded on a vehicle, the threshold value may be set to a high value to make the receiving field strength less susceptible to the effects of the noise when the receiving field strength is high, and may be set to a low value when the receiving field strength is low.

Second Embodiment

Figure 13:
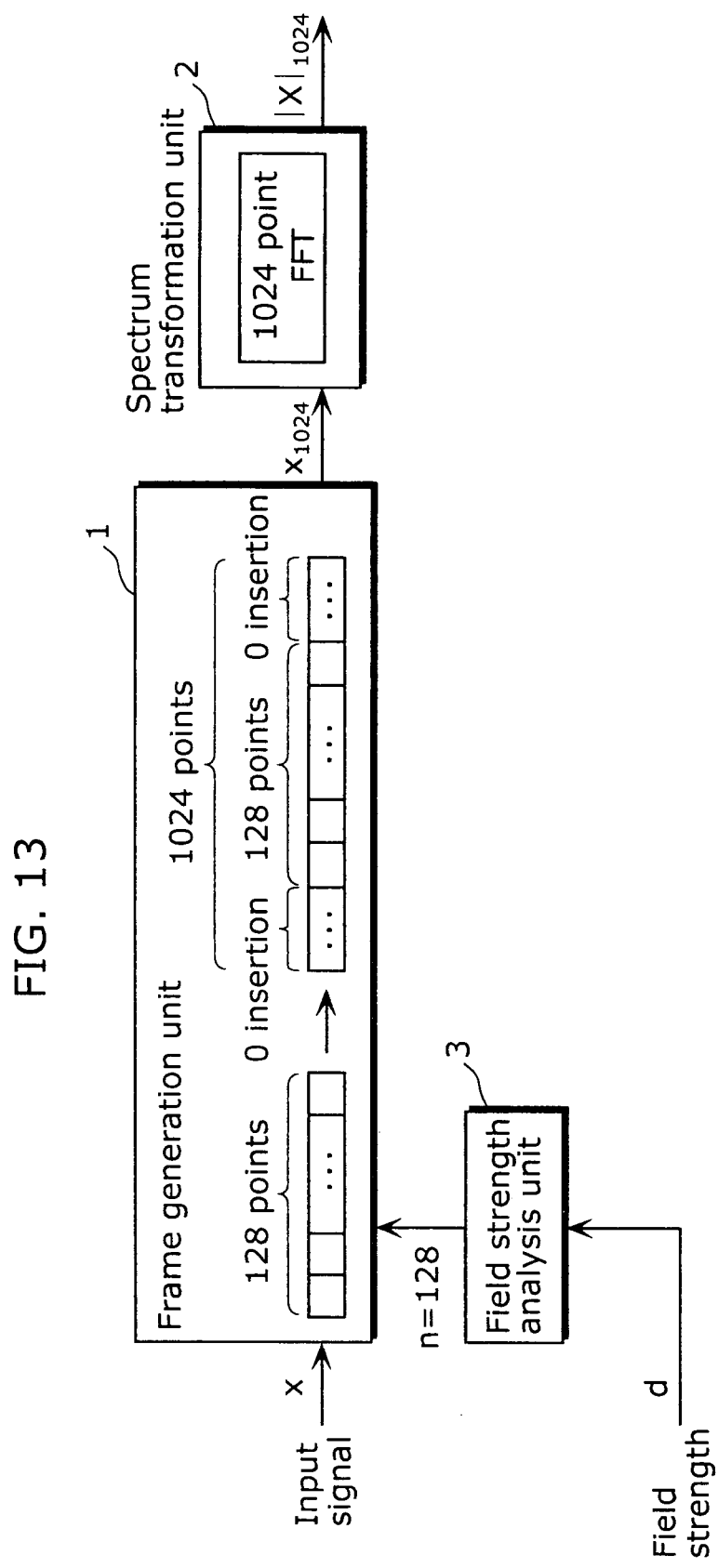
FIG. 13 is a diagram which shows an example of the processing in the frame generation unit when the frame is generated at a fixed length by inserting a 0 at both ends of the determined frame length.

In the second embodiment, the frame is set at a fixed length and a method is devised so that the effects of the first embodiment are obtained while improving the frequency analysis capability of the noise suppresser. The frame generation unit 1 in the present embodiment further has the function of "a zero extension unit operable to add continuous zeros to the generated frame and extend the fixed length when the length of the generated frame does not reach the predetermined length". FIG. 13 is a diagram which shows an example of the processing in the frame generation unit 1 when the frame is generated at a fixed length by inserting zeros at both ends of the determined frame length. As shown in FIG. 13, for example, when the field strength analysis unit 3 determines the frame length to be n=128, the frame generation unit 1 first generates a frame with a frame length indicated by the field strength analysis unit 3 from the input signal. Next, it is further illustrated that the length with which the spectrum transformation is performed in the subsequent unit is zero-extended to 1024 points. In other words, the diagram shows a structure in which the spectrum transformation is performed at a fixed length. More specifically, by using zero-extension, each frame can be set to a fixed length, and thus the spectrum transformation unit 2 always need only perform spectrum transformation at 1024 points. Additionally, the spectrum transformation unit 2 need only store a noise spectrum with a frame length of 1024 points and may subtract this from the input frequency spectrum at a ratio calculated by the noise calculation unit 43. As a result, extremely efficient noise suppression can be performed and there is the effect that frequency analysis capability during the spectrum transformation is improved and the noise suppression ability can be further improved by using zero extension.

Figure 14:
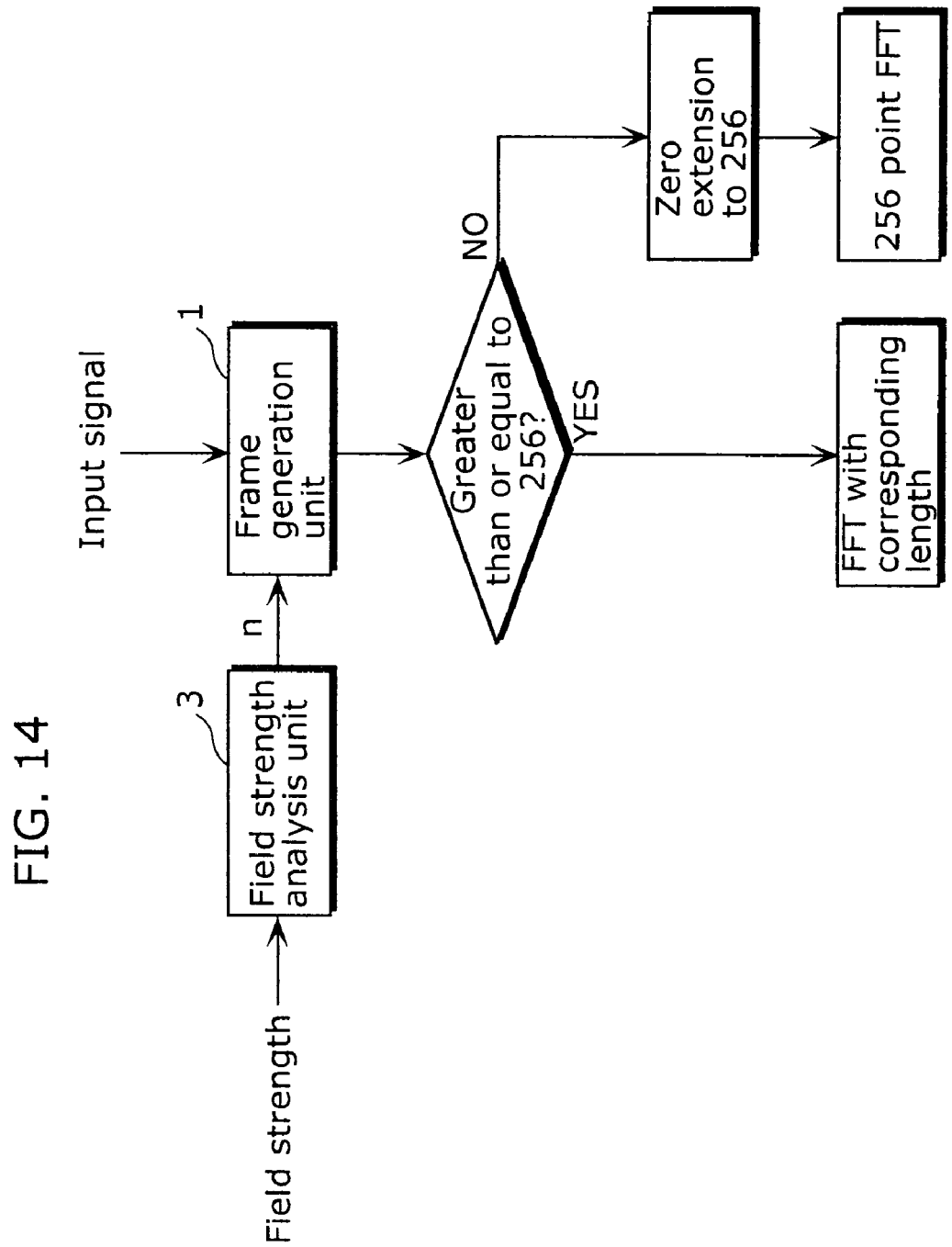
FIG. 14 is a flowchart that shows a sequence of the frame generation unit when the lower limit of the frame length is established.

Although the frame is not set to a fixed length, a lower limit for the frame length can be set and the amount of calculations reduced by establishing a threshold value at the frame length when zero extension is executed. FIG. 14 is a flowchart that shows a sequence in the frame generation unit 1 when the lower limit of the frame length is established. In the diagram, the threshold value is 256. When the frame length n is determined, the frame generation unit 1 judges whether or not the frame length determined by the field strength analysis unit 3 is greater than or equal to 256, and when the frame length is less than 256, the frame is expanded to 256 points by zero extension. The spectrum transformation unit 2 spectrum transforms the frame that is zero extended to 256 points.

Third Embodiment

Figure 15:
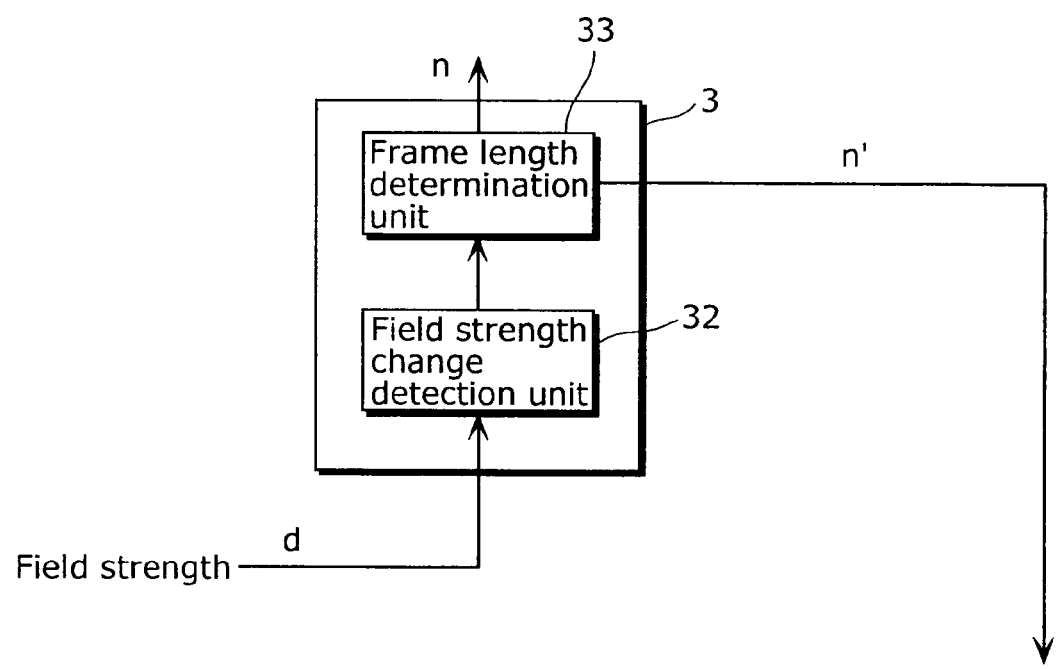
FIG. 15 is a block diagram which shows an example of a structure for comparing the field strength per sample without finding an average of the field strength in an averaged frame.

The third embodiment differs greatly from the first embodiment in the respect that field strength comparison is not performed on an averaged frame basis, and instead the field strength is compared per sample. FIG. 15 is a block diagram which shows an example of a structure used when comparing the field strength without finding an average of the field strength in averaged frames. As shown in FIG. 15, the field strength averaging unit 31 is not present in the field strength analysis unit 3. In other words, when the field strength change detection unit 32 compares field strength values, for example, the field strength may be compared per sample and need not be performed on an averaged frame basis. When the field strength is compared per sample, the frame length which generates the frame can be determined more dynamically and it becomes more likely that the frame length will not be a handy power of two for spectrum transformation in the subsequent unit. When the frame length is revised to a power of two, the frame length determination unit 33

1) may have a configuration in which the sample which acts as a frame boundary is moved to the front and back such that the frame length becomes a power of 2, 2) may have a configuration which zero extends the frame length to become a power of 2.

Figure 16:
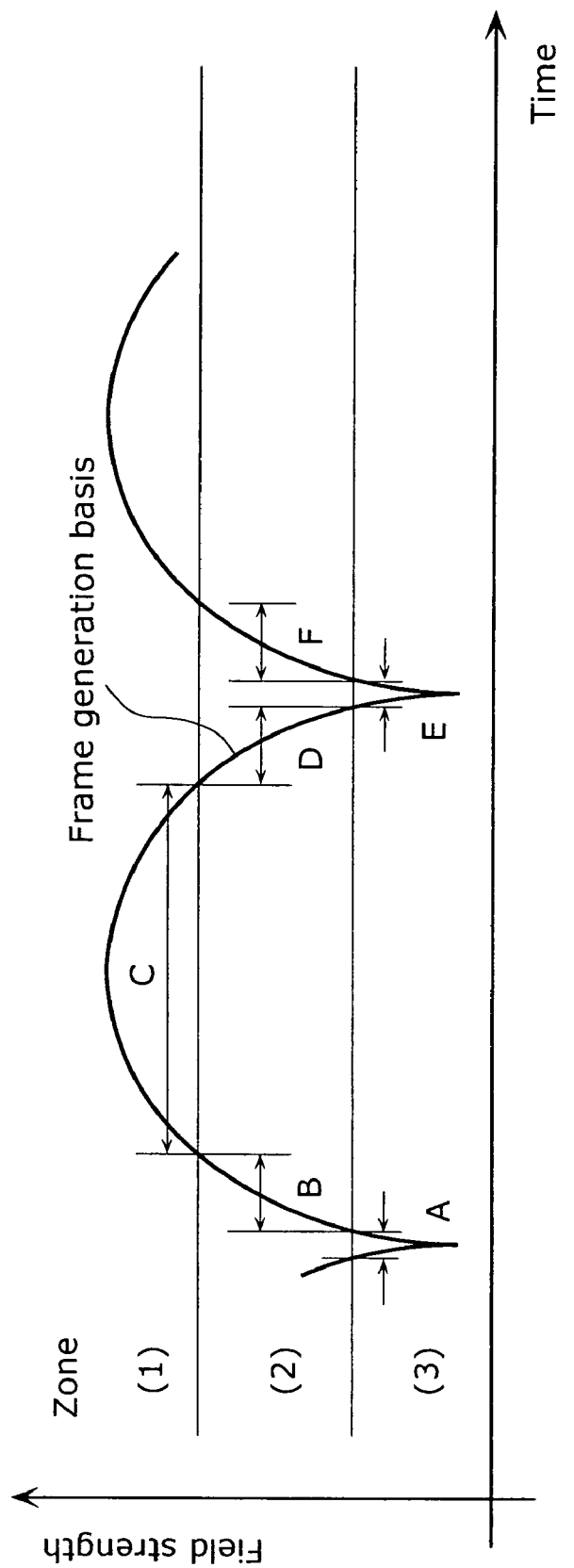
FIG. 16 is a diagram which shows an example of the field strength in the input signal divided into several Zones according to the specific noise pattern of the field.
Figure 17:
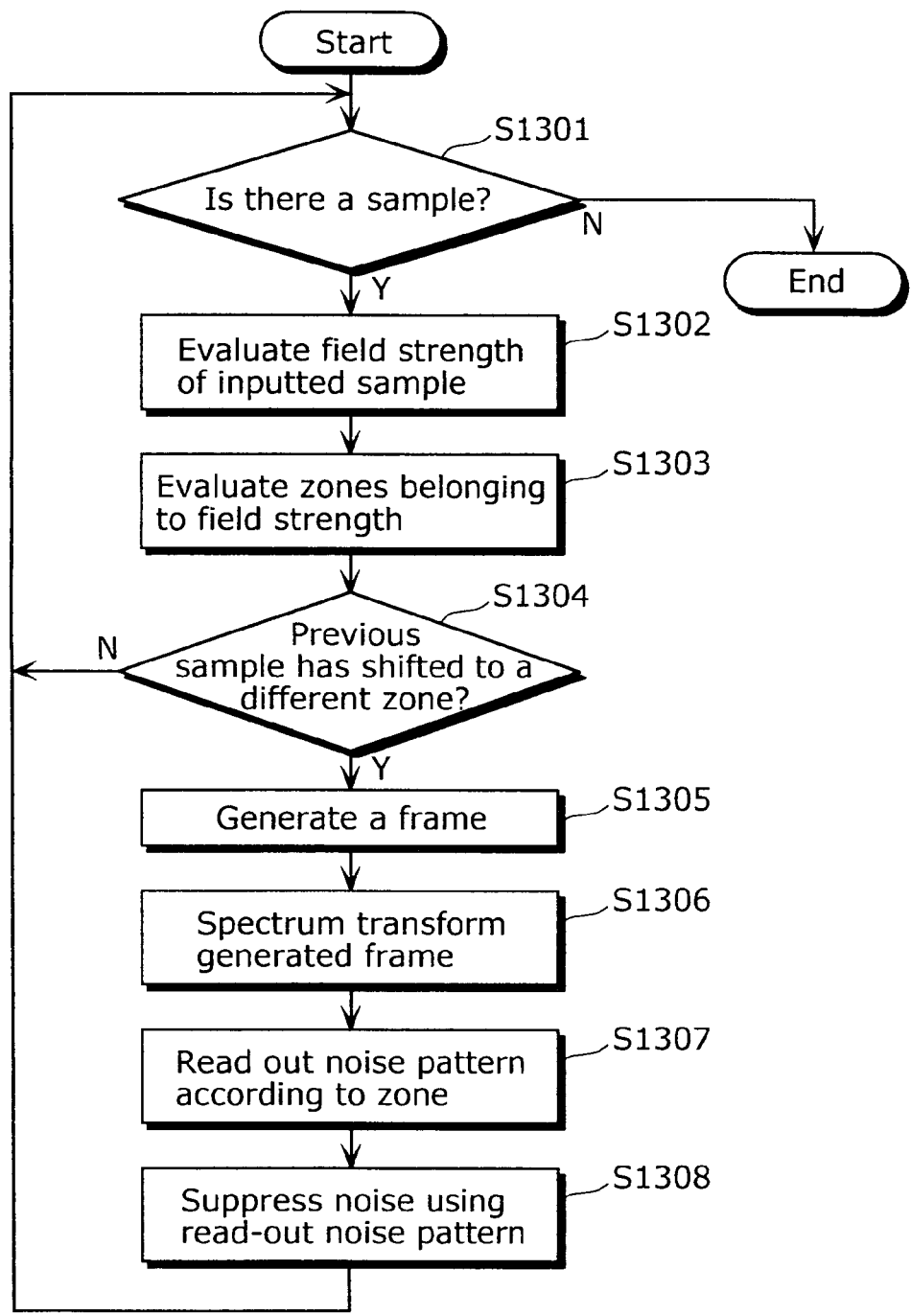
FIG. 17 is a flowchart which shows an example in which the field strength of each sample of the input signal is evaluated and a new frame is generated every time the field strength Zone changes.

Also, when for example the field strength is compared per sample and the frame length is determined, the field strength that is determined for dividing the frame may be divided into a certain amount of Zones, as shown below. FIG. 16 is a diagram which shows an example of the field strength in the input signal divided into a certain amount of Zones according to the noise pattern specific to the field strength. FIG. 17 is a flowchart which shows an example in which the field strength of each sample in the input signal is evaluated and a new frame is generated every time the field strength Zone changes. As shown in FIG. 16, the field strength which borders the frame generation is designated beforehand as (Zone (1), Zone (2) and Zone (3)), and when a field strength in the sample spans two field strength Zones, the frame length determination unit 33 determines the frame length.

For example, the processing sequence for frame A shown on the left end of FIG. 16 is explained by use of FIG. 17. When there is a sample (S1301), the frame generation unit 1 first evaluates the field strength (S1302) and evaluates the Zone to which the field strength in the sample belongs (S1303). Here, the first sample belongs to Zone (3). Next, the frame generation unit 1 evaluates whether or not the next field strength in the sample has shifted to a Zone different from that of the previous field strength in the sample (S1304). In the next sample, the field strength of the input signal decreases further and is located in the same Zone (3) as the field strength of the previous sample. Accordingly, the field strength analysis unit 3 returns to the process in Step S1301 and begins the process for the next sample. In this way, while the field strength values are in the same Zone, the Zone to which the field strength belongs is evaluated using the field strength in the sample, and the comparison of the Zone to which the sample belongs with the Zone to which the previous sample belongs, is repeated. Note that here, when a sample that is above a predetermined number is consecutive in the same Zone, the frame may be temporarily divided into the predetermined number of samples.

Afterwards, the field strength of the input signal switches from decrease to increase and for example the field strength in the next sample is evaluated (S1302); then, the Zone to which the field strength belongs is evaluated (S1303) and it is ascertained that the field strength of the previous sample transfers from Zone (3) to which it had belonged, to Zone (2). On the other hand, the field strength analysis unit 3 outputs the sample number n of samples included in the Zone (3), which had previously belonged to the same Zone, to the frame generation unit 1, and the frame generation unit 1 generates the frame A (S1305). One frame determined as a frame by the frame generation unit 1 is spectrum transformed by the subsequent spectrum transformation unit (S1306), and a patterned noise spectrum corresponding to the Zone is read out (Zone (3)) from the noise estimation unit 4 (S1307). Next, a process is performed to suppress the noise within the frame in Zone (3) using the noise spectrum that is read out (S1308).

Below, the field strength analysis unit 3 returns to the process in Step S1301, evaluates the field strength of each sample subsequently inputted as well as the zone to which the field strength belongs (S1302, 1303) and evaluates whether the field strength of the input signal has transferred from Zone (2) into another zone (S1304). In the case where the field strength in the sample of the input signal shifts from Zone (2) to a different Zone, for example, when the field strength shifts to Zone (1), the number of samples n which belong to Zone (2) are communicated to the frame generation unit 1 and a frame B is generated. Below, the noise suppresser repeats the above process until the sample of the input signal is no longer inputted. In this way, the noise estimation sequence can be simplified and the amount of calculations can be reduced by dividing the field strength into zones according to a field strength which matches the noise characteristics included in the input signal. For example, when the field strength of an FM radio is large, the field strength has a white noise characteristic, and it is clear that the low-pass spectrum increases according to drops in the field strength. Accordingly, when the field strength Zones are designated according to the low-pass noise characteristic, the noise can be estimated without a large error even when there is one noise pattern per field strength zone.

Figure 18:
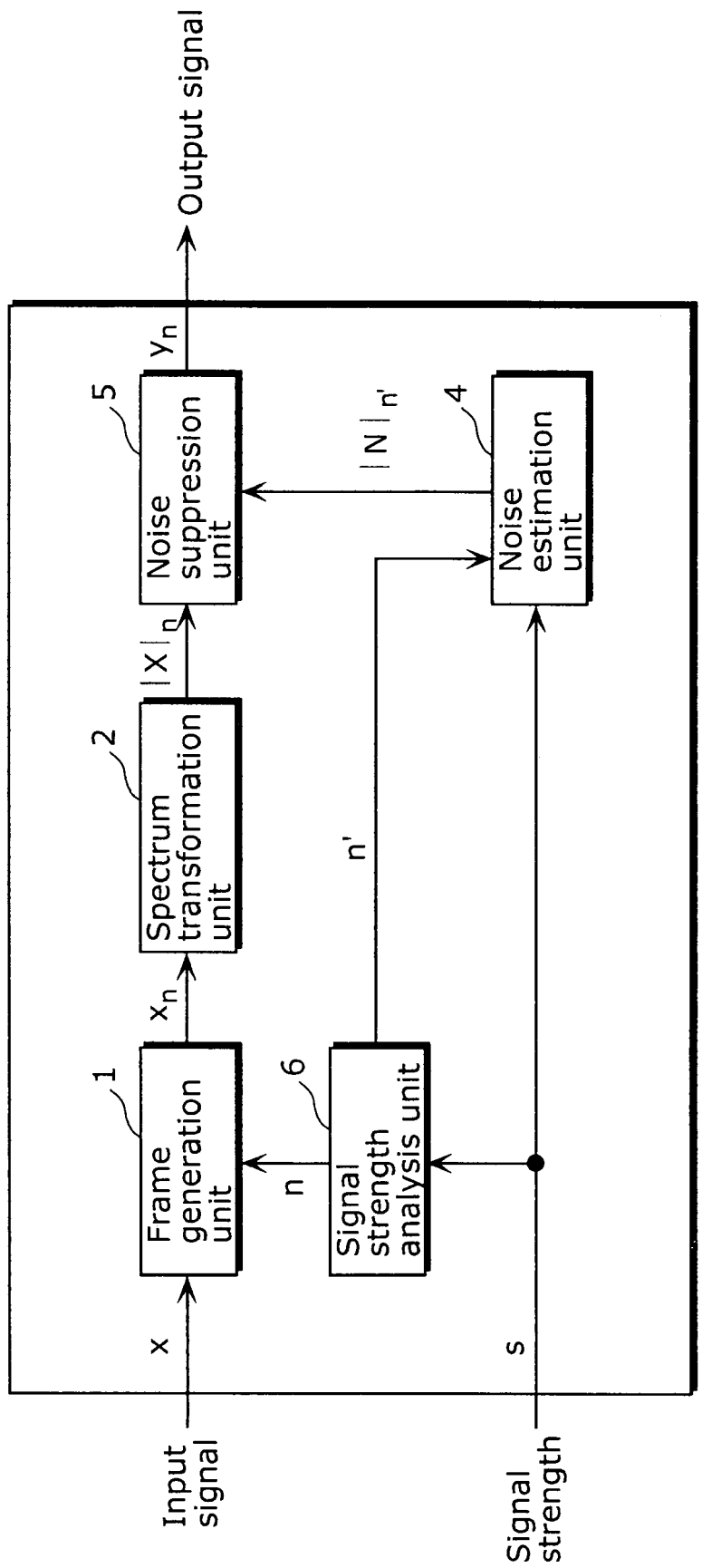
FIG. 18 is a block diagram which shows an example of the structure of the noise suppresser which suppresses noise by estimating a noise pattern in which the input signal is mixed into the signal, using the signal strength level as a standard instead of the field strength.

Note that the applied example of the present noise suppresser in the present embodiment is described for a radio receiver, however the present invention is also useful for a television receiver or a cellular telephone and the like. Further, the present noise suppresser is more suited for a vehicle-mounted FM radio receiver for which the radio wave reception field strength is likely to severely temporally change due to geographical conditions and so on while driving and which requires good sound quality. Also, the present noise suppresser is useful as an application to a device capable of finding the input signal together with the field strength. In other words, the present noise suppresser may be implemented using an index which shows the strength of the input signal instead of the field strength. FIG. 18 is a block diagram which shows an example of the structure of the noise suppresser for suppressing noise by estimating a noise pattern mixed in the input signal using a level of the signal strength, for example the voltage value and so on, as a criterion, instead of the field strength. In the same diagram, for example, a reproduction device such as a CD or a DVD is supposed. In other words, when the input signal is a signal read out by the player from a recording medium such as a DVD, the noise suppression effect in the present invention can be obtained using a signal strength s in the read-out signal which is estimated by the signal strength analysis unit 6.

INDUSTRIAL APPLICABILITY

The noise suppresser in the present invention is useful as a noise suppresser that can effectively suppress steady noise caused by drops in the field strength and can simultaneously suppress transient environmental noise. Also, a receiver that includes the noise suppresser in the present invention is useful as an FM car radio receiver, an AM radio receiver, a television receiver, a cellular telephone and so on, and in particular, a FM radio receiver in a vehicle.

The invention claimed is:

1. A noise suppresser comprising:
an accumulation unit operable to accumulate signal strength values of a digital input signal;
a frame generation unit operable to generate a frame in accordance with the accumulated signal strength values, the frame being a collection of signal values of the digital input signal;
a noise estimation unit operable to estimate a noise pattern mixed in the input signal within the generated frame, according to the signal strength values of the generated frame; and
a noise suppression unit operable to suppress the noise included in the generated frame using the estimated noise pattern.

2. The noise suppresser according to claim 1, further comprising
a signal strength change detection unit operable to detect a change in the signal strength the accumulated signal strength values;
wherein said frame generation unit is, when the detected change in the signal strength exceeds a predetermined value, operable to generate the frame that is a collection of the accumulated signal values in a range for which the detected change in the signal strength does not exceed the predetermined threshold value.

3. The noise suppresser according to claim 2, wherein said frame generation unit includes:

a signal strength calculation unit operable to calculate an average value of the signal strength in each subframe, the subframe being a basis having a predetermined length from which a frame can be generated; and an average value comparison unit operable to compare the average value of the signal strength in the subframe with an average value of the signal strength of an immediately preceding subframe; and wherein said frame generation unit is operable to generate a frame which is made up of a series of subframes accumulated up to, but not including the subframe, when a difference between the average values of the compared signal strengths exceeds a predetermined threshold value.

4. The noise suppresser according to claim 2, wherein said frame generation unit includes:

a signal strength calculation unit operable to calculate an average value of the signal strength in each subframe, the subframe being a basis with a predetermined length from which a frame can be generated;

an average value comparison unit operable to compare the average value of the signal strength in the subframe with an average value of the signal strength of an immediately preceding subframe; and wherein said frame generation unit is operable to generate a frame which is made up of a series of subframes, accumulated up to, but not including the subframe, when a ratio of the average values of the compared signal strengths exceeds a predetermined threshold value.

5. The noise suppresser according to claim 2, wherein said frame generation unit includes:

a signal strength calculation unit operable to calculate an average value of the signal strength in each subframe, the subframe being a basis with a predetermined length from which a frame can be generated;

an average value comparison unit operable to compare the average value of the signal strength of the subframe with the average value of the signal strength of a subframe which is included in a frame immediately preceding the subframe; and wherein said frame generation unit is operable to generate a frame which is made up of a series of subframes, accumulated up to, but not including the subframe, when a difference between or ratio of the average values of the compared signal strengths exceeds a predetermined threshold value.

6. The noise suppresser according to claim 2, wherein said noise suppression unit includes a signal strength average value calculation unit operable to average the signal strength using the frame length generated by said frame generation unit; and a noise calculation unit operable to calculate a noise pattern of the generated frame length according to the signal strength averaged by said signal strength average value calculation unit.

7. The noise suppresser according to claim 2, wherein said frame generation unit is operable to modify the threshold value according to a size of the signal strength detected, and to generate a frame using a first threshold value when a value of the accumulated signal strength values is higher than a predetermined value, as well as a second threshold value which is smaller than the first threshold value when the value of the accumulated signal strength values is lower than the predetermined value.

8. The noise suppresser according to claim 1, wherein said frame generation unit includes:

a zero extension unit operable to extend the frame to a predetermined fixed length by adding consecutive zeros to the generated frame when the length of the generated frame is shorter than the predetermined fixed length;

a spectrum transformation unit operable to transform the frame, which is extended to the fixed length, into a frequency spectrum;

wherein said noise estimation unit is operable to hold a noise pattern made up of the spectrum of the predetermined fixed length, and said noise suppression unit is operable to reduce the fixed length spectrum of the noise pattern estimated with respect to the frame.

9. The noise suppresser according to claim 1, wherein said noise suppression unit is operable to perform a convolution calculation with the estimated noise pattern and the frame-generated input signal, in a time region.

10. The noise suppresser according to claim 1, wherein said noise estimation unit is operable to hold a noise pattern of plural fixed length spectrums which are made up of a different number of samples according to down sampling.

11. The noise suppresser according to claim 1, wherein said noise estimation unit is operable to hold a noise pattern of the fixed length spectrum with the most amount of samples corresponding to the longest frame length.

12. The noise suppresser according to claim 1, wherein said frame generation unit is operable to generate a frame from the signal strength values that are accumulated in the area which exceeds a predetermined level when one of the accumulated signal strength values changes to less than or equal to the predetermined level, said noise estimation unit is operable to estimate the noise pattern mixed in the generated frame, and said noise suppression unit is operable to suppress the noise included in the generated frame using the estimated noise pattern.

13. The noise suppresser according to claim 12, wherein said frame generation unit is operable to divide the signal strength values by level according to a noise characteristic of each of the signal strength values.

14. The noise suppresser according to claim 13, wherein said noise estimation unit is operable to store the noise pattern according to signal strength values in a section that has been divided by levels.

15. The noise suppresser according to claim 1, further comprising a spectrum transformation unit operable to transform the frame into a frequency spectrum using a frame length corresponding to the frame length generated by said frame generation unit.

16. The noise suppresser according to claim 15, wherein said frame generation unit includes a zero extension unit operable to zero extend the frame up until the smallest frame length that can be spectrum transformed, only when the generated frame length is less than the smallest frame length that can be spectrum transformed.

17. The noise suppresser according to claim 1,
wherein said noise suppression unit is operable to calculate a suppression weight for noise according to the noise pattern using a suppression coefficient for adding the noise suppression weight and a threshold coefficient for controlling the noise suppression weight, and to control the suppression coefficient and the threshold coefficient using the frame length generated by said frame generation unit.

18. The noise suppresser according to claim 1,
wherein each of said signal strength values is a receiving signal strength value in a radio communication receiver or an index related to receiving field strength.

19. A car radio comprising:
an accumulation unit operable to accumulate signal strength values of a digital input signal;
a frame generation unit operable to generate a frame in accordance with the accumulated signal strengths values, the frame being a collection of signal values of the digital input signal;
a noise estimation unit operable to estimate a noise pattern mixed in the input signal within the frame according to the signal strength values of the generated frame; and
a noise suppression unit operable to suppress the noise included in the generated frame using the estimated noise pattern.

20. A noise suppression method which comprises:
an accumulation step of accumulating signal strength values of a digital input signal;
a frame generation step of generating a frame in accordance with the accumulated signal strengths values, the frame being a collection of signal values of the digital input signal;
a noise estimation step of estimating a noise pattern mixed in the input signal within the generated frame, according to the signal strength values of the generated frame; and
a noise suppression step of suppressing the noise included in the generated frame using the estimated noise pattern.

* * * * *